March 26, 1957  R. E. GUPPY  2,786,384
PHOTOGRAPHIC APPARATUS
Filed May 24, 1954  3 Sheets-Sheet 1
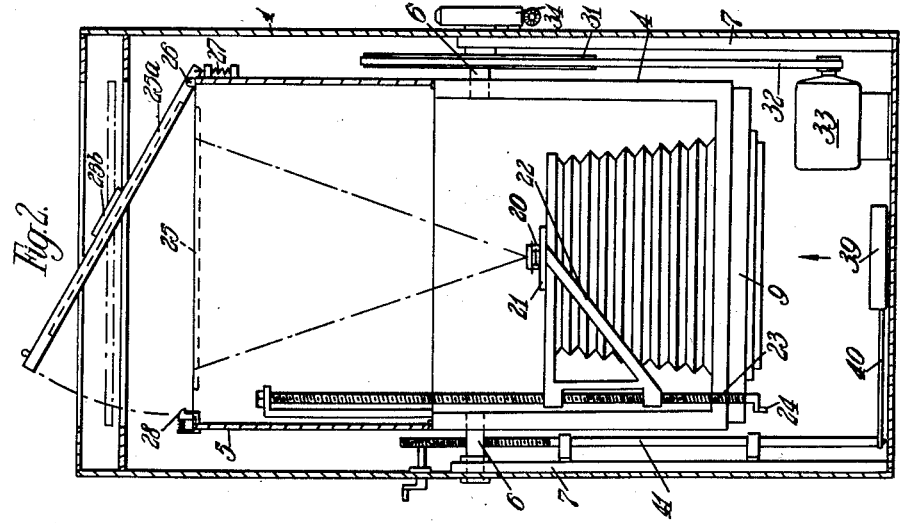
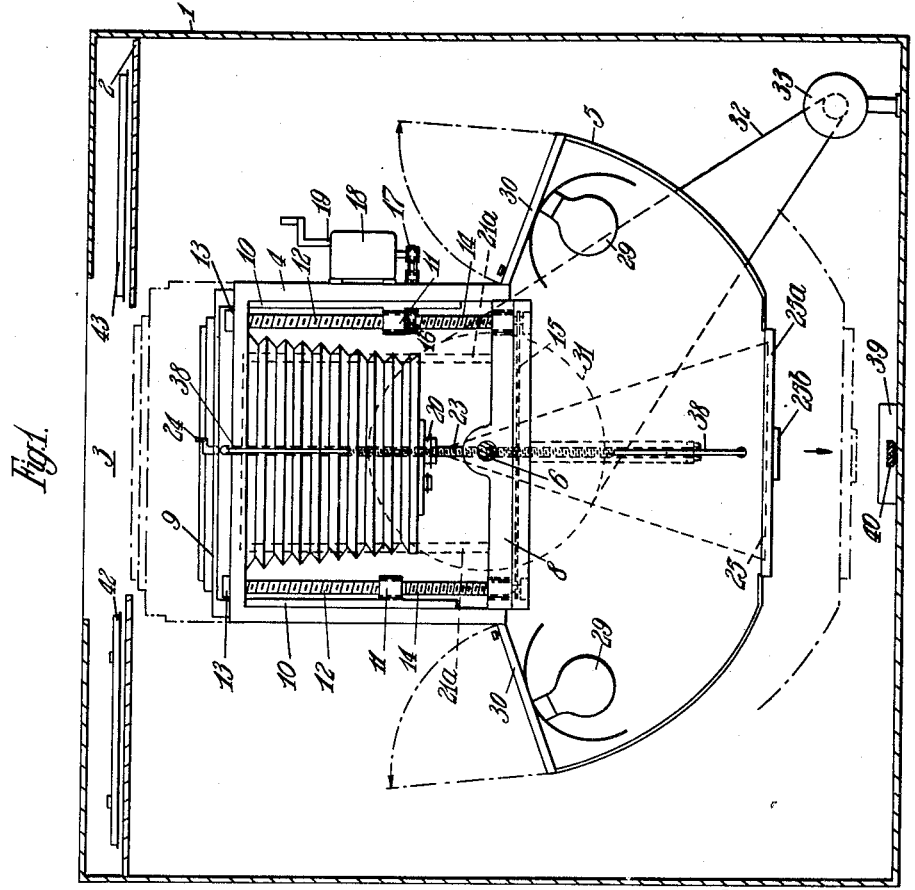

Inventor:
Reginald Ernest Guppy
by
Attorney

March 26, 1957 R. E. GUPPY 2,786,384
PHOTOGRAPHIC APPARATUS
Filed May 24, 1954. 3 Sheets-Sheet 3
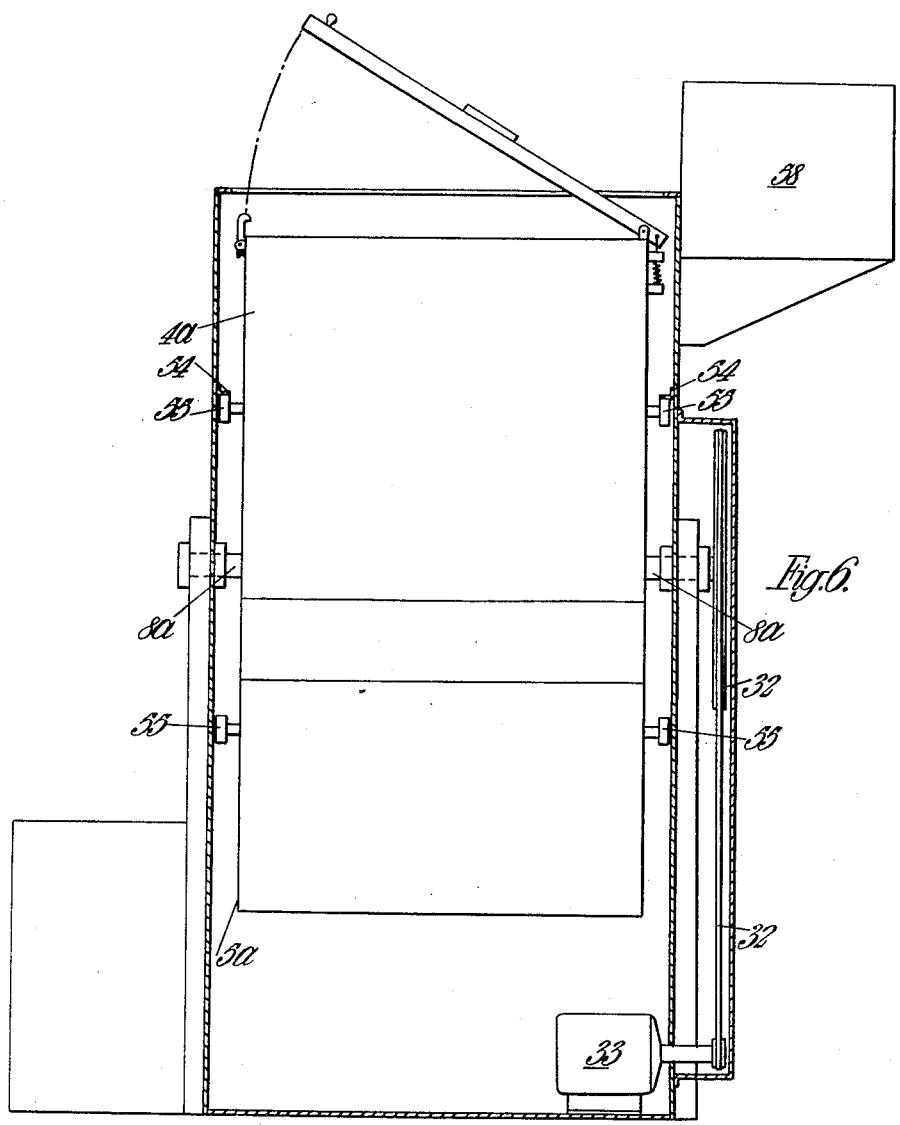
Inventor.
Reginald Ernest Guppy
by
Attorney

United States Patent Office 2,786,384
Patented Mar. 26, 1957

2,786,384

PHOTOGRAPHIC APPARATUS

Reginald Ernest Guppy, Hove, England

Application May 24, 1954, Serial No. 431,960

12 Claims. (Cl. 88—24)

This invention relates to photographic apparatus of the kind comprising a camera and a holder for the copy or material to be photographed mounted in relation thereto, and is intended more especially but not exclusively for the production of negatives and positives in photo-mechanical printing processes such as photo-engraving, photogravure and photolithography.

In the operation of the apparatus at present available for these last mentioned purposes for the production of large negatives and positives and reproduction from large photographs or transparencies considerable time is wasted in placing copy in position and walking to the rear of the camera to focus, walking back to the front of the camera to replace the lens cap and adjust the diaphragm for exposure, and then walking to the dark room to load the slide which must then be carried and placed in the camera, the exposure made, and the dark slide then carried back to the dark room for unloading and processing. When a dark room camera is employed the necessity for loading and carrying a heavy dark slide is avoided, but since the rear of the camera is in the dark room and the copyholder is outside it, to gain any advantage there must be two operators, one remaining in the dark room and the other outside to change the copy. Although the camera, copyholder, and dark room may be in fact separated only by a distance of a few feet it will be appreciated that in the course of a working day one operator using such apparatus would have to cover a considerable distance and may become tired and inefficient.

The general object of the present invention is to provide improved apparatus of the kind referred to which requires for its operation only the minimum amount of movement on the part of an operator. A further object is to provide improved apparatus of the kind referred to in which the amount of floor space occupied is considerably less than with known apparatus.

According to the invention an apparatus of the kind described comprises a camera and a copyholder arranged as a pivotally or angularly movable unit permitting the camera and copyholder respectively to be brought as required into a position or positions in which they are accessible to an operator. According to a further feature of the invention the unit is arranged so that the camera and copyholder can be alternately brought to approximately the same position for loading or unloading.

According to a further feature of the invention the camera and copyholder are mounted or arranged in the unit in such a manner that the distance between them can be adjustably varied.

The invention also consists in an apparatus according to either of the preceding two paragraphs comprising a cabinet in which is pivotally mounted an enclosing structure carrying the camera at one end and the copyholder at the other end, and having means for rotating the structure to bring either the camera or the copyholder opposite an opening in the cabinet as required.

In a preferred arrangement the aforesaid enclosing structure is mounted for rotation about a horizontal axis and comprises parts which can be simultaneously adjusted towards and away from said axis, the parts being preferably adjusted by different amounts to aid in maintaining balance. Rotation of the structure may be effected by power drive and releasable stop means is provided for bringing the structure to rest at the required loading and unloading positions.

The nature of the invention will be more clearly understood from a consideration of the following examples.

In the accompanying drawings,

Figure 1 is a front elevation, partly in section, of a photographic camera apparatus constructed in accordance with the invention;

Figure 2 is a side elevation of the apparatus, partly in section, with the camera in reversed position;

Figures 5 and 6 are diagrammatic side and end elevations of a modified form of photographic camera apparatus.

Figure 5:
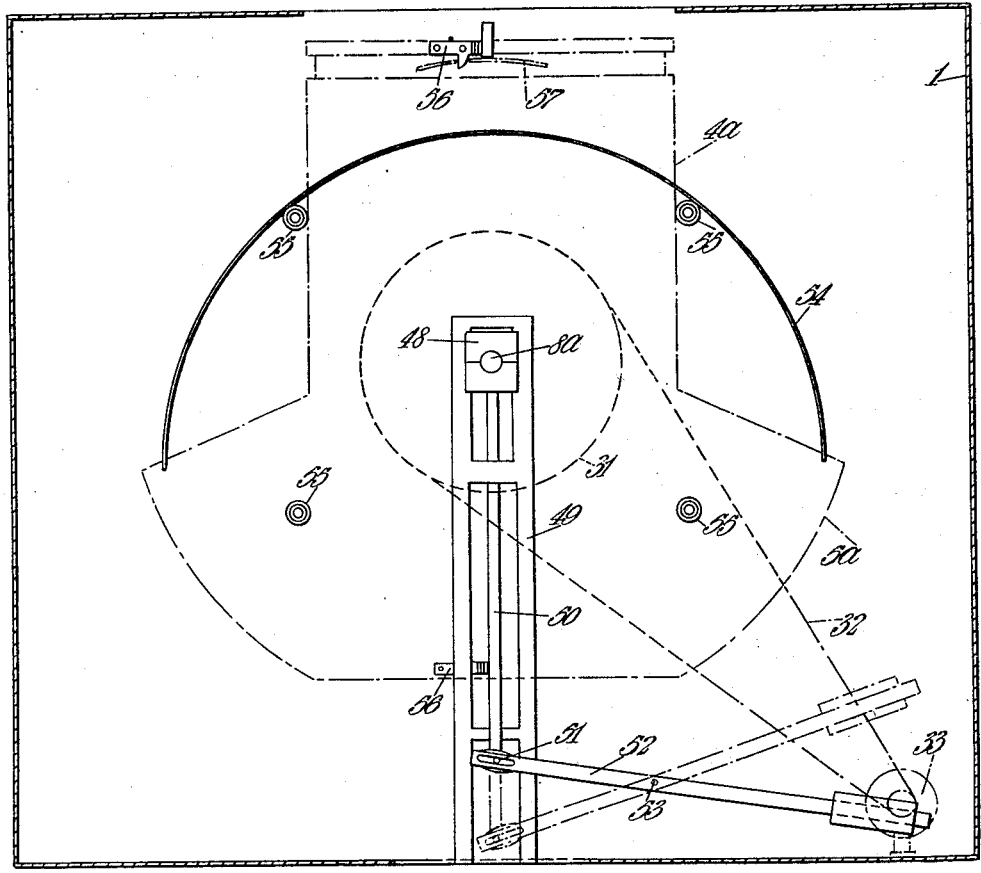

In carrying the invention into effect according to one convenient mode there is provided a rectangular cabinet indicated at 1 which may conveniently be of desk like form in front of which the operator may be seated. The cabinet has a flat top 2 in the centre of which is an opening 3. Within the cabinet and directly below the central upper opening 3 there is mounted a combined camera and copyholder unit comprising an enclosing tubular shell structure having a part 4 of substantially square cross section and a laterally enlarged part 5. The shell structure is pivotally supported for rotation within the cabinet by trunnions 6 carried in bearing members 7 which form part of the cabinet structure. The trunnions are secured to cross members 8 on either side of the shell structure (Figure 1). The camera which is of the usual folding bellows type is mounted in a frame 9 which is slidable within the part 4 of the shell structure. For this purpose the frame 9 has members 10 extending at right angles thereto which are slidable in guides in the shell part 4. The members 10 have threaded lugs 11 engaged with quick pitch threads, e. g. three threads to the inch, on rods 12 rotatably mounted in bearings 13 on the shell structure. The rods 12 also have threaded portions 14 of lesser pitch, e. g. 6 threads to the inch, engaged in threaded apertures in the cross members 8. The rods project below the members 8 and carry sprockets connected by a chain 15. A sprocket 16 on one of the rods is driven by a chain 17 from an electric motor 18 mounted outside the shell structure part 4. A driving handle 19 is also provided for fine adjustment. The arrangement is such that by rotating the threaded rods 12 from the motor or handle the camera and shell can be extended for obtaining varying degrees of enlargement or reduction. The camera lens 20 is carried by a front plate 21 on a bracket 22 (see Figure 2) which is engaged upon a threaded rod 23 rotatably mounted in the frame 9 and having an operating handle 24. Thus by operation of the handle 24 the lens can be adjusted as desired along the optical axis. The camera front is preferably slidable in suitable guides indicated at 21a in Figure 1.

Figure 3:
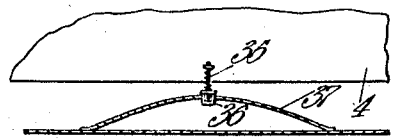
Figure 3 is a plan view of a portion of the camera unit in diagrammatic form, showing the brake and stop device.

A copyholder of the usual construction is provided at the end of the shell part 5 and comprises a glass or other transparent plate 25 and a cover 25a having a central removable panel 25b. The cover is hinged at 26 and a spring loaded rod 27 is provided for displacing the cover to open position when the manually operable catch 28 is released. The shell part 5 is bulged out as seen in Figure 1 to accommodate lighting units 29 for illuminating the copyholder. The lighting units are carried upon hinged doors 30. One of the trunnions 6 carries a pulley 31 which can be driven by a belt 32 from an electric motor 33. Also a brake 34 of any convenient form is arranged to act on an outward extension of the said trunnion. By these means the shell structure can be rotated about its trunnion axis to bring either the screen holder of the camera or the copyholder into position opposite the opening 3 in the cabinet top. In order to ensure that the shell structure will be stopped in the desired positions a brake and stop device is provided as shown in Figure 3. The shell structure carries a pair of outwardly directed spring loaded plungers 35 which can be received in a recess or slot 36 in a curved spring member 37 secured to the side of the cabinet. As the shell structure is rotated, the end of the plunger engages the curved spring, thereby braking the structure, and when the latter reaches a position when either the camera or the copyholder is opposite the top opening 3 of the cabinet the plunger engages in the slot. Levers 38 suitably mounted on the shell structure are provided for withdrawing the plungers to release the shell structure.

If desired, a cold cathode or other light unit 39 can be mounted in the lower part of the cabinet upon a bracket 40. A screwed rod 41 or other means may be provided for adjusting the vertical position of the cold cathode unit.

A negative holder 42 and a focussing screen 43 are slidably arranged upon the top 2 of the cabinet as shown in Figure 1, and are preferably provided with guides or rails so that they can be moved over the opening 3 when required.

Figure 4:
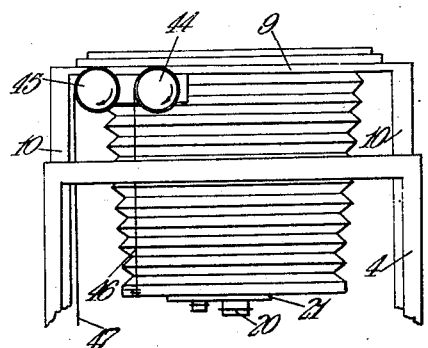
Figure 4 is an elevation of part of the camera unit showing distance indicators.

If desired the camera may be provided with distance indicators giving the distance from the negative holder or focussing screen to the lens and to the copy as shown in Figure 4. A pair of spring loaded and graduated drums 44 and 45 are mounted on the camera base 9. A cord 46 coiled on the drum 44 is connected to the front plate 21 of the camera and a cord 47 coiled on the drum 45 is connected to the copyholder. By the use of a suitable chart the distance indications given by the drums enable negatives to be taken without the use of the focussing screen, thus saving time.

In the operation of the apparatus the shell structure is rotated by means of the motor drive until the copyholder is opposite the cabinet top opening 3 and the cover 25a released from its catch 28 to enable the copy to be placed therein. Preferably a sheet of transparent material having rectangles marked on it is placed over the copy to assist in positioning the same. The interior of the cabinet may be illuminated by amber, red or green lamps if desired to facilitate positioning the copy. The shell structure is then rotated through 180° to bring the camera uppermost as shown in Figure 1, after which the motor 18 is operated to either expand or contract the shell structure to give the required distance between the negative and the copy to afford the desired enlargement or reduction. The camera lens is then adjusted by means of the handle 24 for focussing, this being effected either by use of the focussing screen for accurate work or by using the distance indicators. It will be understood that the camera may be used with a half tone screen as is usual for process work and is also preferably provided with the usual colour filters. This enables the image on the sensitized material to be viewed if desired by using the red filter and switching on the lighting units 29 to enable the sensitized material to be adjusted. The exposure can then be made in the usual manner.

The apparatus may also be employed for making three or four colour sets of colour separation negatives. For this purpose the transparencies are placed in the centre of the copyholder and covered with a glass plate. The panel 25b is removed and the shell structure rotated to the lower position. The cold cathode or other lighting unit 39 is raised to engage the copyholder and after focussing the image the separation negatives may be made in the usual manner. In a somewhat similar manner the apparatus may be employed as in contact printing for making colour correcting masks and colour corrected positives. It will be understood that the mask in question is a low contrast positive made from a colour separated negative and is then bound in register with the appropriate negative, and from this combination the colour corrected positive is made. The mask can be made either by reflected light from a sheet of white paper in the copyholder using the lamps 29, or by direct lighting from the unit 39. Also the apparatus may be used for photographic enlarging purposes, the negative being placed in the camera and illuminated by the unit 39, and the photographic material being placed in the copyholder. This method can conveniently be employed for making large coarse screen negatives or positives for poster work, letterpress, or lithographic printing work.

In carrying the invention into effect according to another mode as illustrated in Figures 5 and 6, provision is made to ensure that irrespective of the effective length of the shell structure the negative or screen holder and the copyholder will always occupy a fixed position relative to the top opening in the cabinet for unloading. To this end the shell structure indicated at 4a, 5a has its trunnions 8a journalled in bearing blocks 48 slidable in vertical guides 49 and supported by vertically slidable rods 50 attached by pin and slot connections 51 to the ends of the weighted levers 52 pivoted at 53. Semicircular guide rails 54 are secured on either side of the cabinet and can be engaged by resiliently covered rollers 55 mounted on the shell structure. A pair of spring loaded catches 56 are mounted on the shell structure and can be engaged in recesses in a curved spring member 57 to lock the unit at the required position. It will be seen that by suitably positioning the rollers 55 the end of the unit, i. e. either the camera or the copyholder, will always have the same relation to the cabinet top when moved to that position. The remaining details of the apparatus are as described in the previous example. If desired a screen magazine 58 may be mounted at the rear of the cabinet as shown in Figure 6 to permit the storage of screens therein prior to use. This magazine is preferably mounted so that it can be moved vertically on the cabinet so as to bring the required screen level with the top of the cabinet for convenient withdrawal for fixing to the camera screen holder.

It will be understood that the invention is not restricted to the examples described above, since the details thereof may be widely varied. Thus the means for illuminating the copy in the copyholder could be mounted in the cabinet, suitable openings or windows being provided in the shell structure. Also the cold cathode or other lighting unit could be arranged for mounting on the copyholder if desired. If certain forms of lighting which cannot be rapidly switched on and off are employed, e. g. mercury vapour lamps, it may be necessary to provide one or more light shielding blinds in association with the copyholder. Such blinds may be of the spring loaded roller type. Thus two or more spring rotated rollers can be mounted directly below and to one side of the glass in the copyholder. These rollers are fitted with blinds consisting of lengths of red, green, or amber plastic material, the arrangement being such that when the copyholder swings into position for loading, a selected blind is automatically drawn across into shielding position immediately below the glass. For convenience of loading and to ensure that the copy is correctly centred or aligned in the copyholder, the sheets of coloured plastic material are ruled diagonally and to represent different framing sizes.

It will also be understood that any convenient means, such as are usual in process cameras, may be provided for varying the camera lens aperture or effecting other adjustments that may be necessary. Also the cabinet which encloses the apparatus may be of desk form in front of which the operator can be seated, and suitable manual or pedal controls are provided for the various operations. The camera may be of the automatic focussing type operable by hand or power. Owing to the restricted expansion of the unit and to avoid undue height thereof when a horizontal pivotal axis is employed, one or more suplementary lenses of shorter focus may be provided to afford a greater degree of enlargement or reduction. When the apparatus is employed for repetition work, such as books, plans and music, a magazine containing sensitized materials may be used to advantage.

By this invention there is provided an apparatus for the purposes described in which the amount of movement required by the operator is very much reduced in comparison with existing apparatus. The invention can be readily adapted to enable the operator to remain seated and to control the exposures, safe lights, and if necessary a magazine containing the sensitive material so that considerable time can be saved. The apparatus can also be conveniently arranged so that the sensitized material can be placed downward in the camera which is a considerable advantage in colour correcting or masking processes and when making several exposures on one plate or film. The invention is not restricted to such arrangements however, since simpler constructions are possible. Thus the invention is not essentially restricted to a horizontal arrangement of the pivotal axis of the camera and copyholder unit, although such an arrangement affords the maximum reduction in the floor space occupied by the apparatus.

I claim:

1. Photographic apparatus of the kind described comprising in combination, a camera and a copyholder respectively carried at opposite ends of a unit having pivotally mounted supporting means, said unit being constituted by relatively displaceable parts each of which is movable towards and away from the pivotal axis of the unit for varying the distance between the camera and copyholder, means for simultaneously effecting adjustments of the said parts towards or away from the said pivotally mounted supporting means by equal amounts so that the unit is maintained substantially in balance about its axis, and an enclosing cabinet within which the unit is arranged, said cabinet having an opening therein to which the camera and copyholder can be respectively brought by rotational movement of the unit for loading and unloading purposes.

2. Apparatus according to claim 1, in which the unit is mounted for rotational movement through at least 180° about a horizontal axis.

3. Apparatus according to claim 1, in which the pivotally mounted unit including the relatively displaceable parts is constituted as a light-tight structure.

4. Apparatus according to claim 1, in which the camera carrying part is slidable in the copyholder carrying part, and said parts are respectively connected to the pivotally mounted supporting means by rotatably mounted threaded adjusting rods having different pitches engageable in threaded bores.

5. Apparatus according to claim 4, in which the rods are rotatably secured in the copyholder carrying part and have a threaded portion of one pitch engageable in the pivotally mounted supporting means and a threaded portion of another pitch engageable in the camera carrying part.

6. Apparatus according to claim 1, in which power means is provided for effecting adjustment of the relatively movable parts.

7. Apparatus according to claim 1, comprising power means for rotating the unit, and releasable stop means for bringing the unit to rest at the required positions.

8. Apparatus according to claim 1, comprising bearings for rotatably supporting the unit about a horizontal axis, said bearings being vertically movable in vertical guides to compensate for the different dimensions of the unit when expanded and contracted.

9. Apparatus according to claim 8, comprising means for yieldingly supporting the bearings in their guides, and fixed curved guides engageable by rollers on the unit for determining the position of the latter.

10. Apparatus according to claim 9 in which the yielding supporting means comprise pivoted counterweight means.

11. Apparatus according to claim 1, comprising an enclosing structure for the camera and copyholder, and means for illuminating the copyholder carried by said structure.

12. Apparatus according to claim 1, comprising a cabinet enclosing the unit and having a top opening with which the camera and copyholder can be aligned by rotating the unit, and a magazine for holding screens mounted on the cabinet adjacent said opening.

References Cited in the file of this patent

UNITED STATES PATENTS

| | | |
|---|---|---|
| 138,663 | Leggo | May 6, 1873 |
| 1,635,741 | Carpio | July 12, 1927 |
| 2,411,704 | Beattie | Nov. 26, 1946 |
| 2,599,269 | Markle | June 3, 1952 |